United States Patent
Yang

(10) Patent No.: US 12,427,930 B2
(45) Date of Patent: Sep. 30, 2025

(54) FIXING DEVICE FOR ON-VEHICLE NECK PILLOW

(71) Applicant: Shenzhen Lang Pu creative advertising Co., LTD, Shenzhen (CN)

(72) Inventor: Jun Yang, Ningxiang (CN)

(73) Assignee: Shenzhen Lang Pu creative advertising Co., LTD, Shenzhen (CN)

( * ) Notice: Subject to any disclaimer, the term of this patent is extended or adjusted under 35 U.S.C. 154(b) by 98 days.

(21) Appl. No.: 18/410,853

(22) Filed: Jan. 11, 2024

(65) Prior Publication Data
US 2025/0128664 A1    Apr. 24, 2025

(30) Foreign Application Priority Data
Oct. 18, 2023 (CN) .......................... 202322788401.5

(51) Int. Cl.
*B60R 11/00*    (2006.01)
(52) U.S. Cl.
CPC ....... *B60R 11/00* (2013.01); *B60R 2011/0012* (2013.01); *B60R 2011/0059* (2013.01); *B60R 2011/008* (2013.01)
(58) Field of Classification Search
CPC .... B60R 2011/0017; B60R 2011/0059; B60N 2/882; A47C 7/383
USPC ............... 224/275, 558; 248/229.12, 229.22, 248/231.41; 297/397–401
See application file for complete search history.

(56) References Cited

U.S. PATENT DOCUMENTS

| 5,868,471 | A | * | 2/1999 | Graham | B60N 2/882 5/640 |
| 8,888,187 | B2 | * | 11/2014 | Albino | B60N 2/885 297/400 |
| 10,118,526 | B1 | * | 11/2018 | Fan | B60N 2/882 |
| 2023/0019792 | A1 | * | 1/2023 | Wang | B60N 2/818 |

FOREIGN PATENT DOCUMENTS

| CN | 212195197 | U | * | 12/2020 | ............. B60N 2/882 |
| CN | 216300877 | U | * | 4/2022 | |
| CN | 219769705 | U | * | 9/2023 | |
| KR | 20200142448 | A | * | 12/2020 | ............. B60N 2/841 |

OTHER PUBLICATIONS

Translation of CN 219769705 (Sep. 29, 2023).*
Translation of KR 20200142448 (Dec. 22, 2020).*
Translation of CN -216300877 (Apr. 15, 2022).*
Translation CN 212195197 (Dec. 22, 2020).*

* cited by examiner

Primary Examiner — Nathan J Newhouse
(74) Attorney, Agent, or Firm — JEEN IP LAW, LLC

(57) ABSTRACT

Disclosure is a fixing device for an on-vehicle neck pillow, including a fixing part and a neck pillow, where the fixing part includes a left clamping arm assembly, a right clamping arm assembly and a base, and the left clamping arm assembly and the right clamping arm assembly are of the same structure; sliding slots are transversely formed at two opposite sides of the base, the left clamping arm assembly and the right clamping arm assembly are arranged in the corresponding sliding slots, respectively, and the left clamping arm assembly and the right clamping arm assembly are both connected with the base in a sliding manner.

8 Claims, 9 Drawing Sheets

FIXING DEVICE FOR ON-VEHICLE NECK PILLOW

CROSS-REFERENCE TO RELATED APPLICATIONS

This application claims priority to Chinese Patent Application No. 202322788401.5, filed on Oct. 18, 2023, which is hereby incorporated by reference in its entirety.

TECHNICAL FIELD

The present disclosure relates to the technical field of automobile accessories, in particular to a fixing device for an on-vehicle neck pillow.

BACKGROUND

As a kind of supplies fixed on vehicle seats to provide support for human necks, on-vehicle neck pillows can effectively relieve fatigue during journey and make drivers and passengers comfortable, and they are thus deeply loved of the drivers and passengers.

However, most of the neck pillows on the market are fixed using elastic bands with some elasticity as a fixing device, and elastic bands used in this type of fixation method are easy to aging and loosen in the long-term use.

With the rapid development of electric vehicles, integrated sports seats have come into being. Featuring comfortable and simple structure, the integrated sports seats have gradually become fashion trendsetters, therefore, it is very necessary to develop an on-vehicle neck pillow device adaptable to the integrated sports seats.

SUMMARY

An objective of the present disclosure is to provide a fixing device for an on-vehicle neck pillow, aiming to solve the problem that the existing fixing device for vehicle seats cannot adapt to the use requirements of the integrated sports seat.

The present disclosure is implemented as follows: a fixing device for an on-vehicle neck pillow, including a fixing part and a neck pillow, where the fixing part includes a left clamping arm assembly, a right clamping arm assembly and a base, and the left clamping arm assembly and the right clamping arm assembly are of the same structure;

sliding slots are transversely formed at two opposite sides of the base, the left clamping arm assembly and the right clamping arm assembly are arranged in the corresponding sliding slots, respectively, and the left clamping arm assembly and the right clamping arm assembly are both connected with the base in a sliding manner;

Further, the left clamping arm assembly and the right clamping arm assembly each includes a C-shaped clamping arm, a button body and a first spring, where the C-shaped clamping arm include a sliding rod transversely disposed at the end portion, the button body and the first spring are both installed inside the sliding rod, the button body is connected with the sliding rod in a form of sliding up and down by pressing, a cover plate is arranged at the bottom of the sliding rod, and the first spring is disposed below the button body.

Further, a surface of the button body is provided with a first toothed pattern and a first button, the first button is arranged on one side of the first toothed pattern, and the first toothed pattern and the first button both penetrate through a housing of the corresponding sliding rod.

Further, a second toothed pattern is arranged inside each of the sliding slots at a position in contact with the first toothed pattern, and the second toothed pattern matches and engages with the first toothed pattern.

Further, the base further includes a mounting cavity and a release button and a second spring disposed inside the mounting cavity, and the release button is connected with the mounting cavity in a form of sliding up and down.

Further, the release button includes a snap block disposed on a surface of the release button and a second button, and the second button is arranged on one side of the snap block.

Further, a connecting portion is arranged on one side of the neck pillow, the connecting portion includes a connecting base, a slot is formed on the connecting base, a snap-fitting hole adapted to the snap block is formed on the slot, and the neck pillow is detachably connected to the fixing part through the connecting base.

Further, the base further includes a connecting stand, and the connecting stand is disposed at a position on the base corresponding to the connecting portion.

Further, the mounting cavity is disposed and formed on the connecting stand, and the depth of mounting cavity is greater than the thickness of the release button.

Compared with the prior art, the present disclosure has the following beneficial effects:
1. the present disclosure may be adapted to integrated sports seats with different widths by setting the left clamping arm assembly and the right clamping arm assembly connected to the base in a sliding manner, effectively increasing the use scenarios.
2. The neck pillow and the fixing part in the present disclosure are connected in a snap-fitting and detachable manner, making the mounting and disassembly more convenient, and making it convenient for packaging and transportation.

Figure 1:
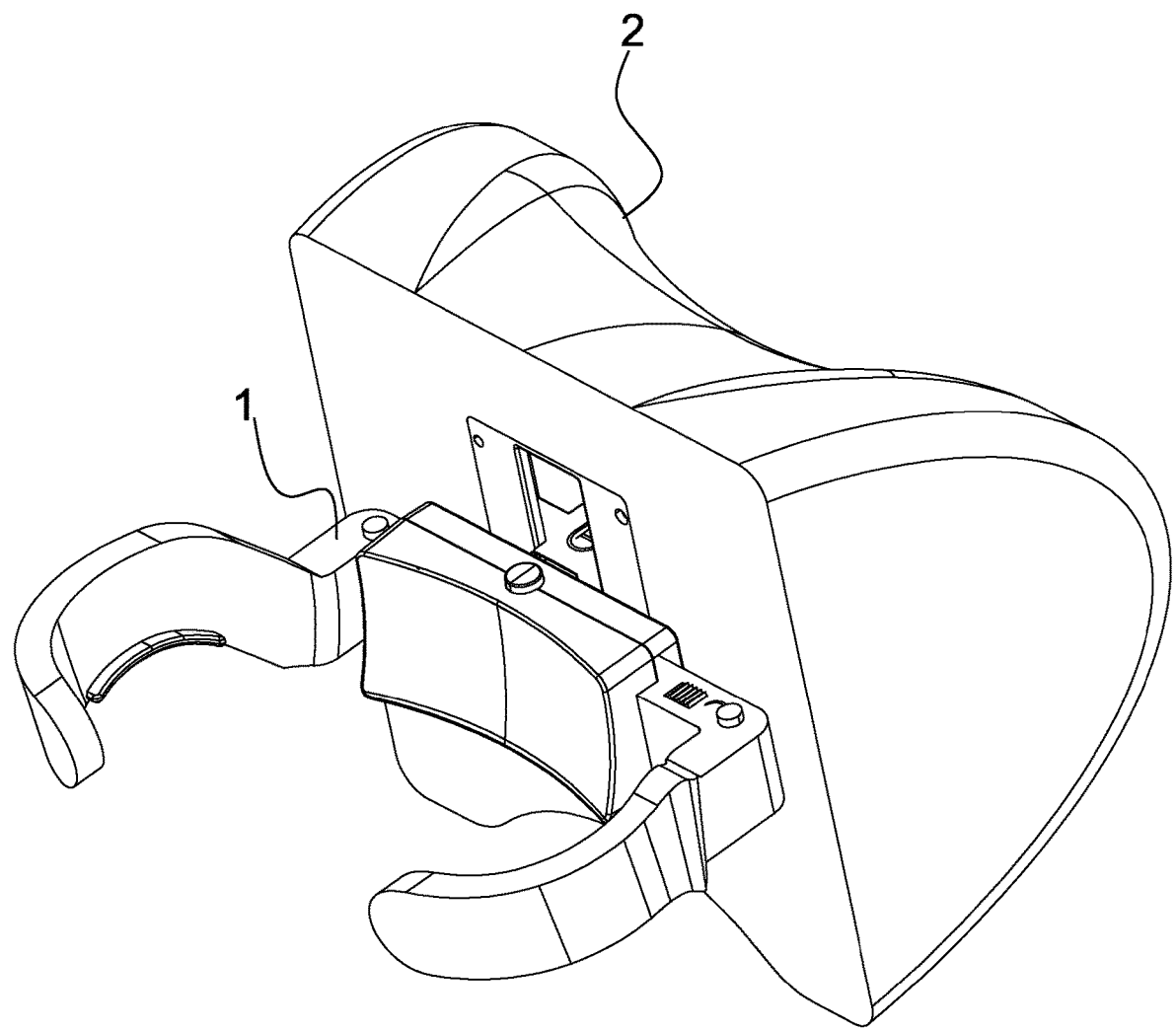
FIG. 1 is a schematic diagram of a three-dimensional structure of the present disclosure.
Figure 2:
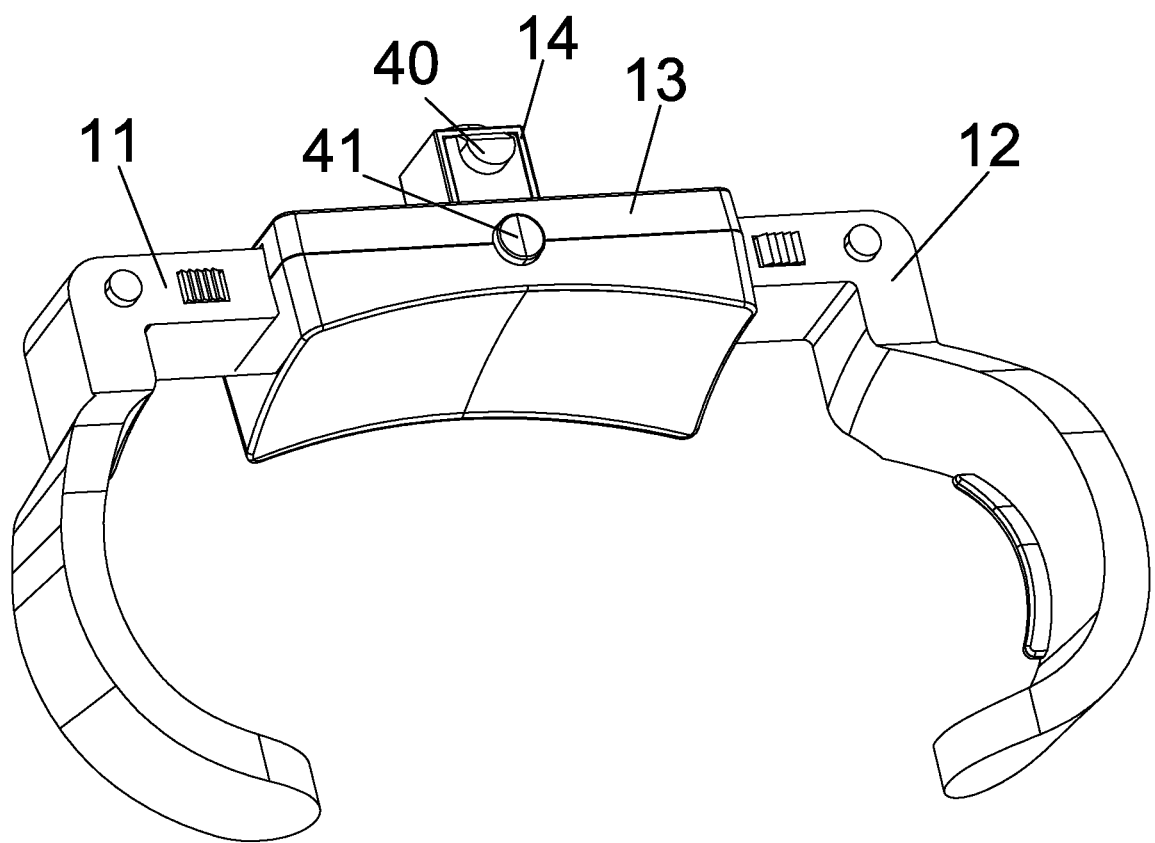
FIG. 2 is a schematic diagram of a three-dimensional structure of a fixing part in the present disclosure.

In the accompanying drawings: 1. fixing part; 2. neck pillow; 11. left clamping arm assembly; 12. right clamping arm assembly; 13. base; 14. connecting stand; 20. C-shaped clamping arm; 21. button body; 22. first spring; 23. sliding rod; 24. cover plate; 30. connecting portion; 31. connecting base; 32. slot; 33. snap-fitting hole; 40. snap block; 41. second button; 111. positioning rod; 131. front shell; 132. rear shell; 133. release button; 134. sliding slot; 135. mounting cavity; 136. second toothed pattern; 137. second spring; 201. first toothed pattern; and 202. first button.

DESCRIPTION OF EMBODIMENTS

In the present disclosure, unless otherwise explicitly specified and defined, the terms "mounting", "connecting", "connection", "fixing", and the like. should be understood in a broad sense, for example, they may be a fixed connection, a detachable connection, or an integrated connection; may be a mechanical connection, or an electrical connection; may be a direct connection, or an indirect connection via an intermediate medium; and may be communication inside two elements, or an interactive relation between two elements. Those of ordinarily skilled in the art can understand specific meanings of the above terms in the present disclosure according to specific circumstances.

The present disclosure will be further described below in conjunction with the accompanying drawings and specific embodiments:

as shown in FIGS. 1-9, a fixing device for an on-vehicle neck pillow is provided, the fixing device includes a fixing part 1 and a neck pillow 2, where the fixing part 1 includes a left clamping arm assembly 11, a right clamping arm assembly 12 and a base 13, and the left clamping arm assembly 11 and the right clamping arm assembly 12 are of the same structure; sliding slots 134 are transversely formed at two opposite sides of the base 13, the left clamping arm assembly 11 and the right clamping arm assembly 12 are arranged in the corresponding sliding slots 134, respectively, and the left clamping arm assembly 11 and the right clamping arm assembly 12 are both connected with the base 13 in a sliding manner; and the neck pillow 2 is detachably snap-fitted on the fixing part 1, and the left clamping arm assembly 11 and the right clamping arm assembly 12 are symmetrically designed. In the present embodiment, the fixing part 1 includes a front shell 131 and a rear shell 132, the slide slots 134 are formed inside the front shell 131 and the rear shell 132, and the front shell 131 and the rear shell 132 are fixed to each other through screws or snaps.

Figure 3:
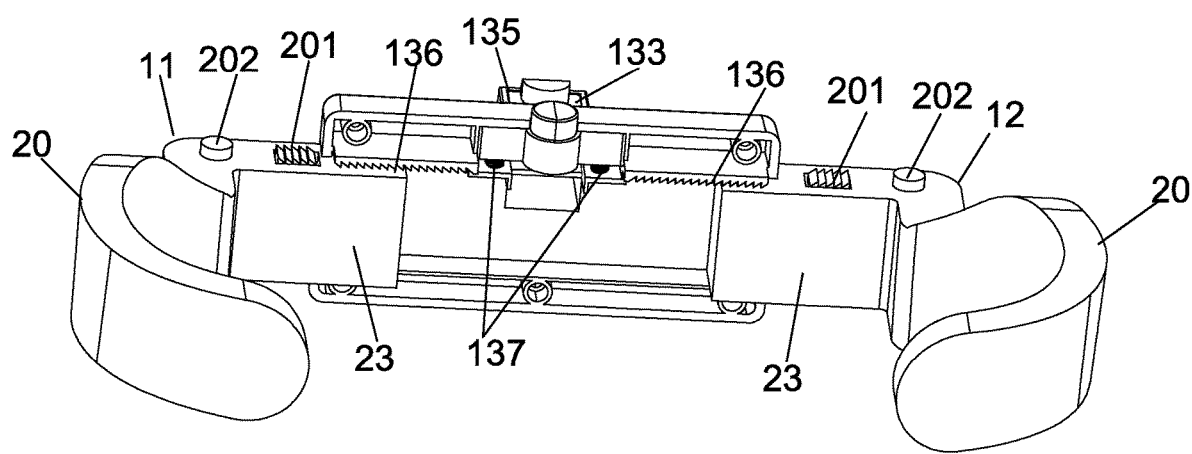
FIG. 3 is a schematic diagram of an internal structure of a base in the present disclosure.
Figure 4:
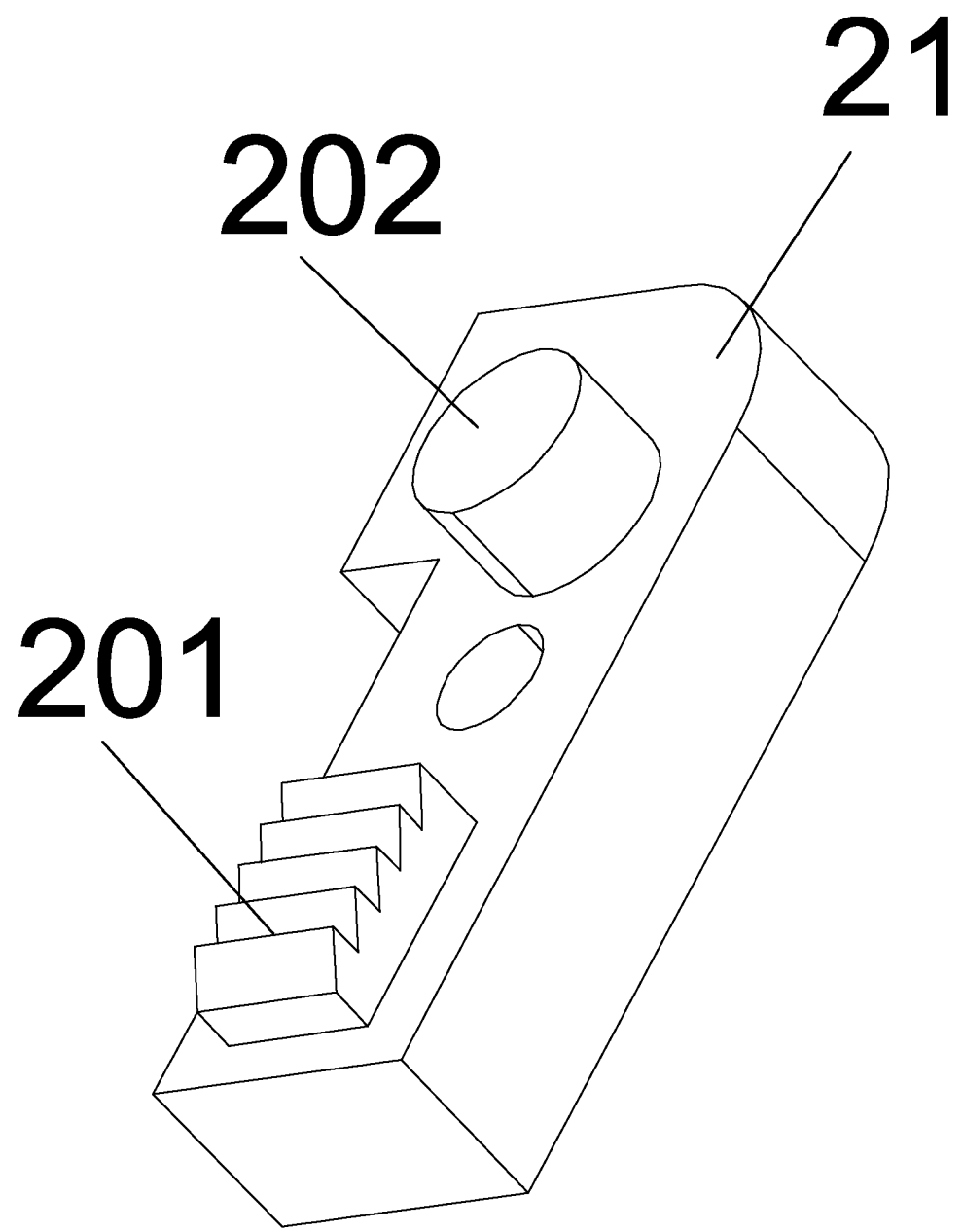
FIG. 4 is a structural schematic diagram of a button body in the present disclosure.
Figure 5:
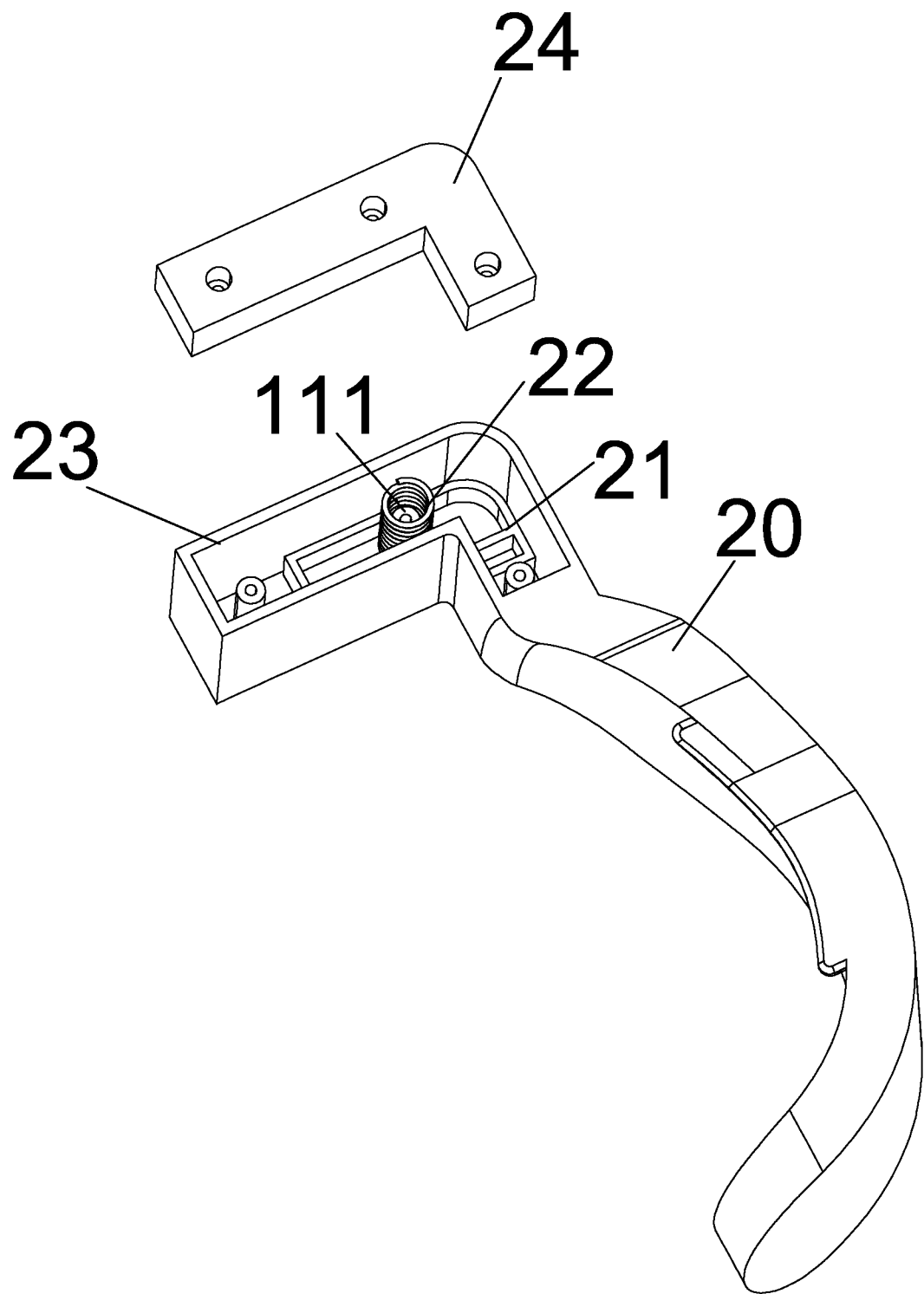
FIG. 5 is a schematic diagram of an internal structure of a left clamping arm assembly in the present disclosure.
Figure 6:
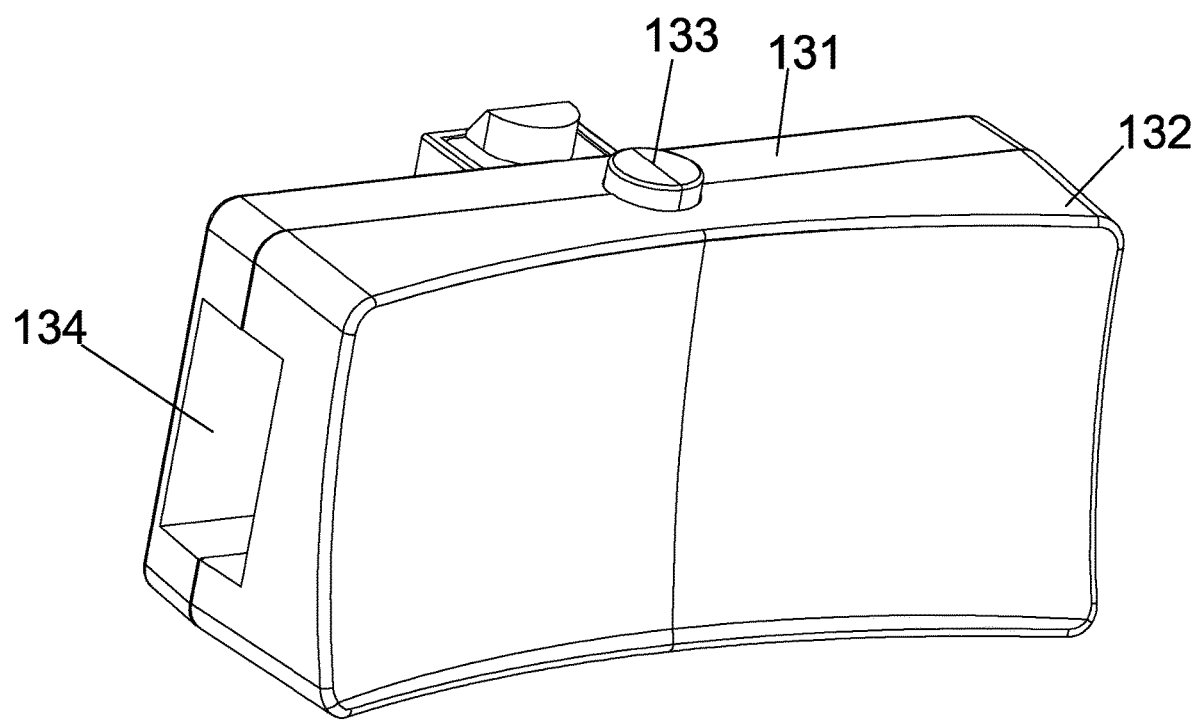
FIG. 6 is a structural schematic diagram of a base in the present disclosure.
Figure 7:
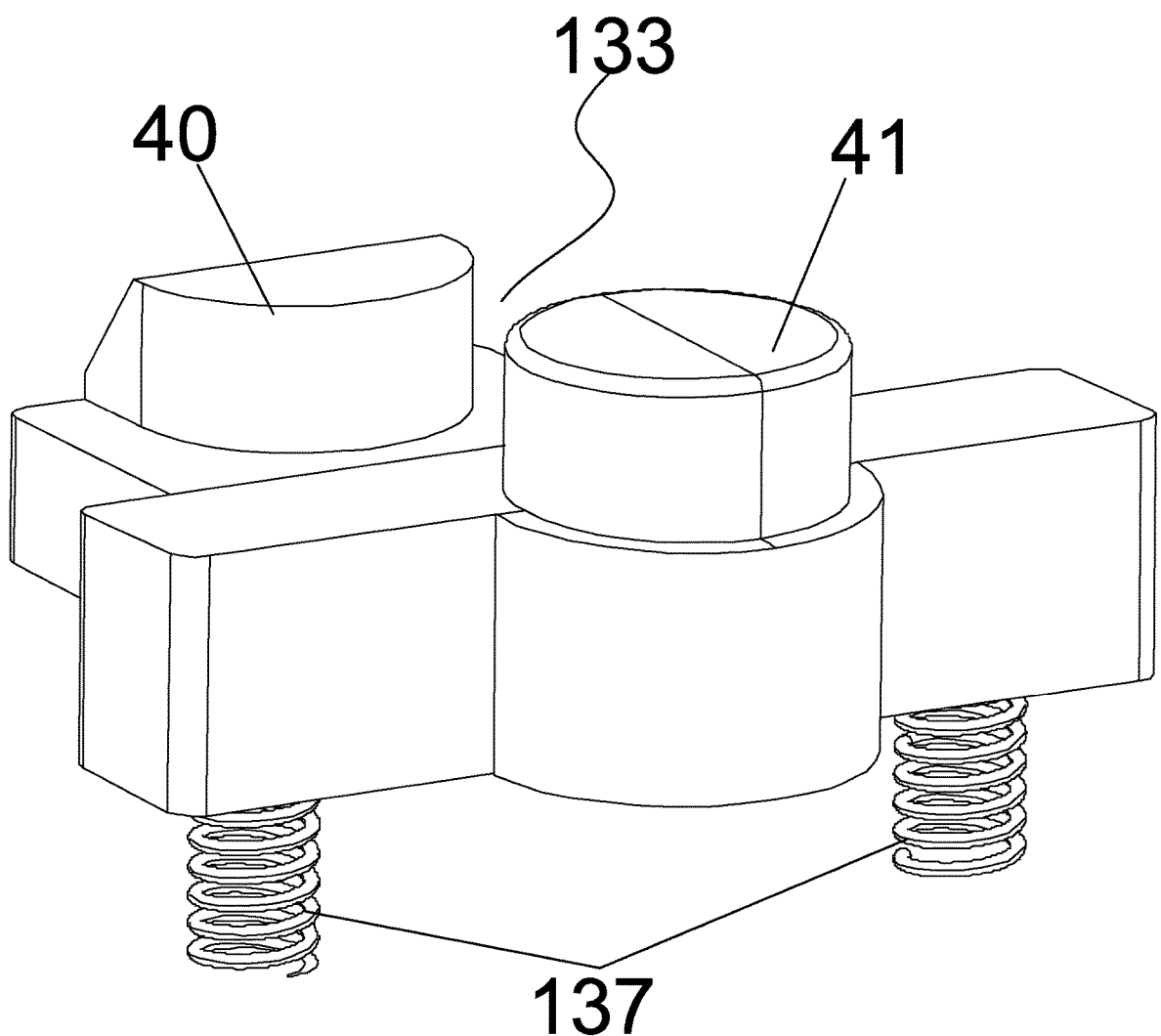
FIG. 7 is a structural schematic diagram of a release button and a second spring in the present disclosure.

In some embodiments, as shown in FIGS. 3-5, the left clamping arm assembly 11 and the right clamping arm assembly 12 each includes a C-shaped clamping arm 20, a button body 21 and a first spring 22, where the C-shaped clamping arm 20 include a sliding rod 23 transversely disposed at the end portion, the button body 21 and the first spring 22 are both installed inside the sliding rod 23, the button body 21 is connected with the sliding rod 23 in a form of sliding up and down by pressing, and a cover plate 24 is arranged at the bottom of the sliding rod 23. In the present embodiment, the button body 21 is in the form of an L-shaped structural body, the first spring 22 is disposed below the button body 21, and the C-shaped clamping arm 20 is matched with and is adapted to arc surfaces on both sides of an integrated sports seat in a car by disposing the C-shaped clamping arm 20, where the sliding rod 23 is adapted to the sliding slots 134, the sliding rod 23 is inserted in the sliding slots 134, a groove is formed at the bottom of the C-shaped clamping arm 20, a positioning rod 111 is disposed in the groove, the button body 21 passes through the positioning rod 111 via a preset hole and is installed in the groove in a form of sliding up and down, the depth of the groove is greater than the overall thickness of the button body 21, the first spring 22 is sleeved on the positioning rod 111, the cover plate 24 is fixed on the C-shaped clamping arm 20 through screws or snaps, and the arrangement of the positioning rod 111 and the button body 21 in the L-shape structural body makes the button body 21 when sliding up and down by pressing more stable.

It should be noted that the button body 21 can also be configured in a structural body of any shape, and the button body 21 is adapted to the groove.

In some embodiments, as shown in FIGS. 3-4, a surface of the button body 21 is provided with a first toothed pattern 201 and a first button 202, the first button 202 is arranged on one side of the first toothed pattern 201, the first toothed pattern 201 and the first button 202 both penetrate through a housing of the corresponding sliding rod 23, a second toothed in pattern 136 is arranged inside each of the sliding slots 134 at a position in contact with the first toothed pattern 201, the second toothed pattern 136 is evenly arranged on an inner side surface of each of the sliding slots 134 in a transverse direction, the second toothed pattern 136 matches and engages with the first toothed pattern 201, and the left clamping arm assembly 11 and the right clamping arm assembly 12 are in a position locked state when the first toothed pattern 201 and the second toothed pattern 136 are occluded with each other; when the first button 202 on the button body 21 is pressed, the button body 21 sides downwards in an L-shaped groove and the first spring 22 is deformed and retracted at the same time, the first toothed pattern 201 is disengaged from the second toothed pattern 136, and the left clamping arm assembly 11 and the right clamping arm assembly 12 are in an adjustable state, in which case the left clamping arm assembly 11 and the right clamping arm assembly 12 can be pulled left and right to adapt to seats in different widths, further, the left clamping arm assembly 11 and the right clamping arm assembly 12 can be disassembled to facilitate transportation and packaging, which is very practical;

in such a way, the overall thickness of the button body 21 is less than the depth of the groove, which facilitates the sliding up and down of the button body 21.

In some embodiments, as shown in FIGS. 3-4, the base 13 further includes a mounting cavity 135 and a release button 133 and a second spring 137 disposed inside the mounting cavity 135, and the release button 133 is connected with the mounting cavity 135 in a form of sliding up and down. In the present embodiment, two groups of the second spring 137 are provided, so that the release button 133 is more stable when it is pressed, the release button 133 includes a snap block 40 disposed on a surface of the release button 133 and a second button 41, the second button 41 is arranged on one side of the snap block 40, the mounting cavity 135 is disposed and formed on a connecting stand 14, the connecting stand 14 is located on the front shell 131, the snap block 40 and the second button 41 both penetrate through the corresponding front shell 131, and the depth of mounting cavity 135 is greater than the thickness of the release button 133, such that the release button 133 can slide up and down for unlocking and locking.

Figure 8:
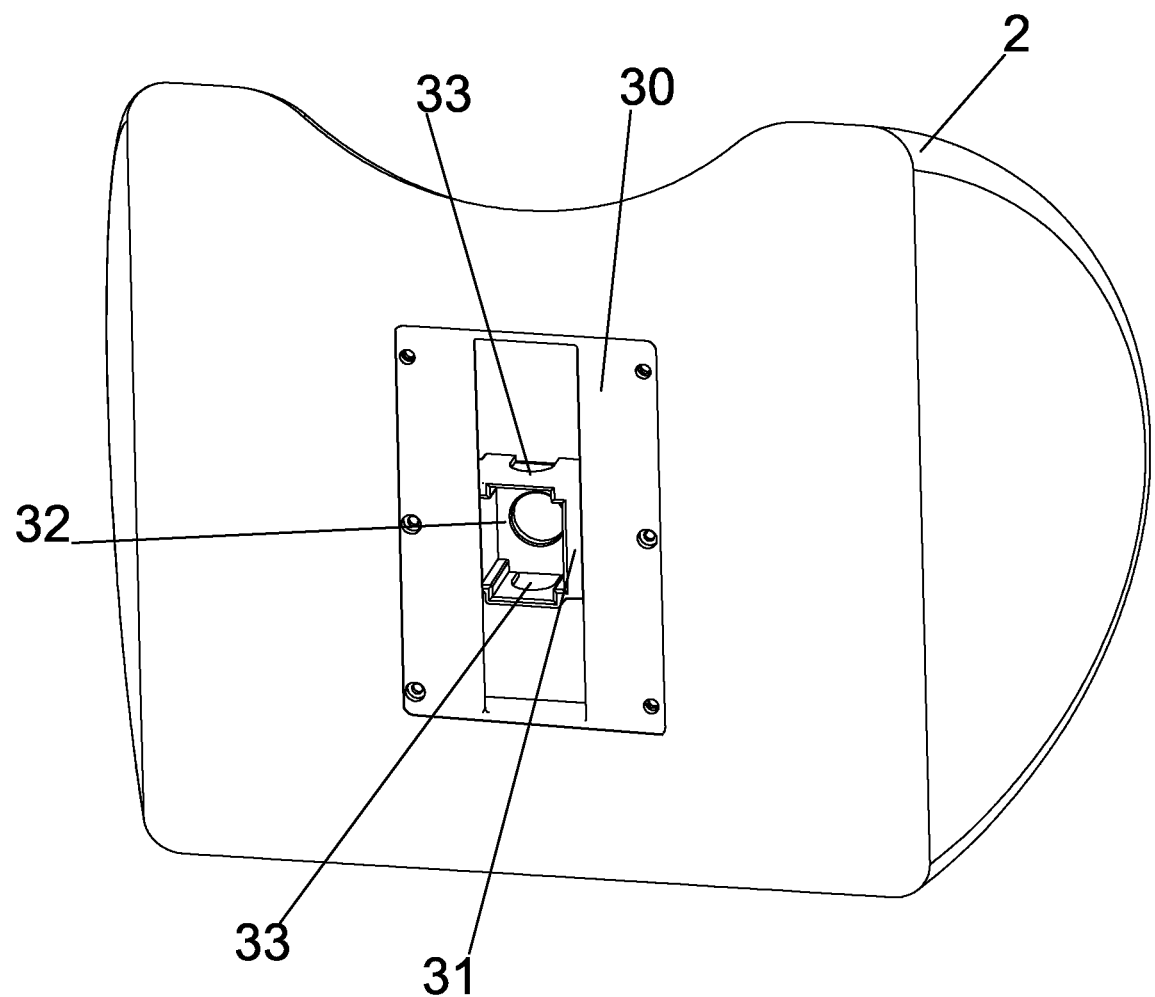
FIG. 8 is a structural schematic diagram of a neck pillow in the present disclosure.
Figure 9:
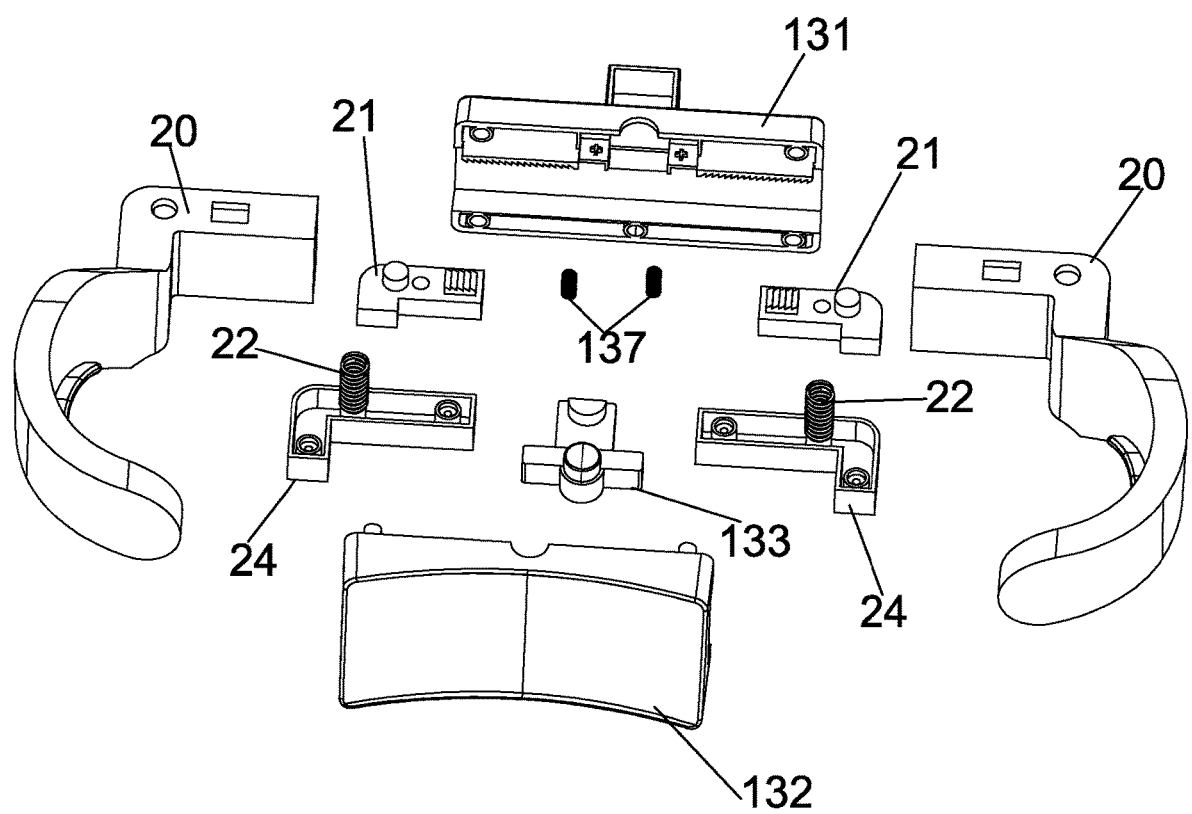
FIG. 9 is an overall exploded view of a fixing part in the present disclosure.

In some embodiments, as shown in FIG. 8, a connecting portion 30 is arranged on one side of the neck pillow 2, the connecting portion 30 is embedded on a back surface of the neck pillow 2, the connecting portion 30 includes a connecting base 31, a slot 32 is formed on the connecting base 31, at least one set of snap-fitting holes 33 adapted to the snap block 40 is formed on the slot 32, the neck pillow 2 is detachably connected to the fixing part 1 through the connecting base 31, the base 13 further includes the connecting stand 14, and the connecting stand 14 is disposed at a position on the base 13 corresponding to the connecting portion 30, where the slot 32 is adapted to the connecting stand 14, in use, the connecting stand 14 on the fixing part 1 is inserted into the slot 32 on the neck pillow 2, and the slot 32 is a groove body with a certain depth, such that the neck pillow 2 is connected to the fixing part 1 in a more stable manner, and when the snap block 40 is snapped into the corresponding snap-fitting holes 33, the mounting and abutting of the neck pillow 2 and the fixing part 1 are then completed, making the mounting very convenient and simple, and also convenient for packaging and transportation after disassembly, as well as subsequent cleaning and maintenance, and the like.

Working principles of the present embodiment are as follows:

when the fixing device in the present disclosure is used, the neck pillow 2 is inserted into the slot 31 on the fixing part 1 to complete the mounting and abutting of the neck pillow 2 and the fixing part 1, the first button 202 on the button body 21 of the left clamping arm assembly 11 or the right clamping arm assembly 12 is then pressed, the button body 21 slides downwards in the L-shaped groove under pressure, the first spring 22 is deformed and retracted at the same time, the first toothed pattern 201 on the button body 21 is disengaged from the second toothed pattern 136 in the sliding slots 134, in which case, the distance between the left clamping arm assembly 11 and the right clamping arm assembly 12 can be adjusted randomly to achieve the best use or fixed state, the C-shaped clamping arm 20 is clamped on the integrated sports seat, and at the same time, the left clamping arm assembly 11 or the right clamping arm assembly 12 can be pulled out to make it convenient for packaging and transportation;

when the button body 21 is released, the force generated by the reset of the first spring 22 pushes the first toothed pattern 201 to be engaged with the second toothed pattern 136, in which case the left clamping arm assembly 11 or the right clamping arm assembly 12 is in a locked state; and when it is desired to disassemble the neck pillow 2, it is only necessary to press and hold the second button 41 on the release button 133, the release button 133 slides downwards, and the snap block 40 disengages from the snap-fitting holes 33, such that the disassembly of the neck pillow 2 is completed.

The above descriptions are only preferred embodiments of the present invention, and are not intended to be limiting of the present disclosure, and various changes and modifications may be made by those skilled in the art. Any modifications, equivalent substitutions, improvements, and the like within the spirit and principles of the present disclosure are intended to be included within the scope of protection of the present disclosure.

What is claimed is:

1. A fixing device for an on-vehicle neck pillow, comprising a fixing part and a neck pillow,
    wherein the fixing part comprises a left clamping arm assembly, a right clamping arm assembly and a base, and the left clamping arm assembly and the right clamping arm assembly are of the same structure; and
    sliding slots are transversely formed at two opposite sides of the base, the left clamping arm assembly and the right clamping arm assembly are arranged in the corresponding sliding slots, respectively, and the left clamping arm assembly and the right clamping arm assembly are both connected with the base in a sliding manner;
    wherein the left clamping arm assembly and the right clamping arm assembly each comprises a C-shaped clamping arm, a button body and a first spring,
    wherein the C-shaped clamping arm comprise a sliding rod transversely disposed at an end portion, the button body and the first spring are both installed inside the sliding rod, the button body is connected with the sliding rod in a form of sliding up and down by pressing, a cover plate is arranged at a bottom of the sliding rod, and the first spring is disposed below the button body.

2. The fixing device for an on-vehicle neck pillow according to claim 1, wherein a surface of the button body is provided with a first toothed pattern and a first button,
    the first button is arranged on one side of the first toothed pattern,
    the first toothed pattern and the first button both penetrate through a housing of the corresponding sliding rod.

3. The fixing device for an on-vehicle neck pillow according to claim 2, wherein a second toothed pattern is arranged inside each of the sliding slots at a position in contact with the first toothed pattern, and the second toothed pattern matches and engages with the first toothed pattern.

4. The fixing device for an on-vehicle neck pillow according to claim 1, wherein the base further comprises a mounting cavity and a release button and a second spring disposed inside the mounting cavity, and the release button is connected with the mounting cavity in a form of sliding up and down.

5. The fixing device for an on-vehicle neck pillow according to claim 4, wherein the release button comprises a snap block disposed on a surface of the release button and a second button, and the second button is arranged on one side of the snap block.

6. The fixing device for an on-vehicle neck pillow according to claim 5, wherein a connecting portion is arranged on one side of the neck pillow,
    the connecting portion comprises a connecting base,
    a slot is formed on the connecting base,
    at least one set of snap-fitting holes adapted to the snap block is formed on the slot,
    the neck pillow is detachably connected to the fixing part through the connecting base.

7. The fixing device for an on-vehicle neck pillow according to claim 6, wherein the base further comprises a connecting stand, and the connecting stand is disposed at a position on the base (13) corresponding to the connecting portion.

8. The fixing device for an on-vehicle neck pillow according to claim 7, wherein the mounting cavity is disposed and formed on the connecting stand, and a depth of mounting cavity is greater than a thickness of the release button.

* * * * *